US009940841B2

(12) United States Patent
Pierre et al.

(10) Patent No.: US 9,940,841 B2
(45) Date of Patent: Apr. 10, 2018

(54) METHOD FOR IMPROVING A FLIGHT TRAJECTORY OF AN AIRCRAFT AS A FUNCTION OF METEOROLOGICAL CONDITIONS

(71) Applicant: THALES, Courbevoie (FR)

(72) Inventors: Christophe Pierre, Fontenilles (FR); Mathieu Le Merrer, Toulouse (FR)

(73) Assignee: THALES, Courbevoie (FR)

( * ) Notice: Subject to any disclaimer, the term of this patent is extended or adjusted under 35 U.S.C. 154(b) by 178 days.

(21) Appl. No.: 14/994,007

(22) Filed: Jan. 12, 2016

(65) Prior Publication Data
US 2016/0225265 A1    Aug. 4, 2016

(30) Foreign Application Priority Data

Jan. 30, 2015   (FR) ...................... 15 00173

(51) Int. Cl.
    *G08G 5/00* (2006.01)
    *G01C 21/20* (2006.01)
    *G01C 23/00* (2006.01)

(52) U.S. Cl.
    CPC .......... *G08G 5/0039* (2013.01); *G01C 21/20* (2013.01); *G01C 23/00* (2013.01); *G08G 5/0047* (2013.01); *G08G 5/0021* (2013.01); *G08G 5/0052* (2013.01); *G08G 5/0091* (2013.01)

(58) Field of Classification Search
    CPC ................... G01C 23/00; G01C 21/20; G08G 5/003–5/0039; G08G 5/0017–5/0026; G08G 5/0047; G08G 5/0052; G08G 5/0091; G05D 1/0005
    See application file for complete search history.

(56) References Cited

U.S. PATENT DOCUMENTS

2003/0093219 A1   5/2003  Schultz et al.
2010/0198433 A1   8/2010  Fortier et al.

FOREIGN PATENT DOCUMENTS

FR   2 939 505 A1   6/2010

*Primary Examiner* — Adam R Mott
(74) *Attorney, Agent, or Firm* — BakerHostetler LLP

(57) ABSTRACT

A navigation aid method to determine an improved trajectory between points of departure and arrival as a function of a trajectory cost, comprises: determining a grid of nodes, loading meteorological data at the nodes, determining for each node, an average instantaneous cost from a first instantaneous cost as a function of a ground speed taking into account meteorological data loaded at the node concerned, and from a second instantaneous cost as a function of a ground speed that does not take into account the loaded meteorological data, determining a length of a trajectory passing through the node and arriving at the point of arrival, determining a cost grid assigning, at each of the nodes of the grid, a local cost determined from the average instantaneous cost and the length, determining an improved trajectory from the cost grid, and graphically representing the improved trajectory and/or the cost grid to a crew.

17 Claims, 13 Drawing Sheets

METHOD FOR IMPROVING A FLIGHT TRAJECTORY OF AN AIRCRAFT AS A FUNCTION OF METEOROLOGICAL CONDITIONS

CROSS-REFERENCE TO RELATED APPLICATION

This application claims priority to foreign French patent application No. FR 1500173, filed on Jan. 30, 2015, the disclosure of which is incorporated by reference in its entirety.

FIELD OF THE INVENTION

The invention relates to a navigation aid method for optimizing a flight trajectory as a function of meteorological conditions. The invention is of particular use in the flight management systems embedded on aircraft, for allowing the crew to optimize an initial flight trajectory as a function of changes in the meteorological conditions encountered by the aircraft on its trajectory.

BACKGROUND

The known navigation aid systems have means for computing trajectories between waypoints defined in a plan of the flight which can, for example, be entered by the pilot. The trajectories, computed at the start of the flight and possibly re-updated during the flight, are a support for the manoeuvres of the aircraft, whether decided by the pilot or by an automatic piloting system. In the known state of the art, the computed trajectory is split between a lateral trajectory, typically characterized by waypoints defined by a latitude and a longitude, and a vertical profile applied to this lateral trajectory to take into account constraints, for example of relief or of fuel consumption management.

Among the navigation aid systems, flight management systems, called FMS, are known of which a functional architecture is schematically represented in FIG. 1. In accordance with the ARINC 702 standard, they notably handle the functions of:

Navigation LOCNAV, 170, to perform the optimal locating of the aircraft as a function of geolocalization means (GPS, GALILEO, VHF radio beacons, inertial units, etc.), Flight plan FPLN, 110, for inputting the geographic elements that make up the skeleton of the route to be followed (departure and arrival procedures, waypoints, etc.), Navigation database NAVDB, 130, for constructing geographic routes and procedures from data included in the bases (points, beacons, intersection or altitude legs, etc.), Performance database, PERF DB 150, notably containing the aerodynamic and engine parameters of the aircraft, Lateral trajectory TRAJ, 120, for constructing a continuous trajectory from points of the flight plan, observing the aeroplane performance levels and the containment constraints, Predictions PRED, 140, for constructing an optimized vertical profile on the lateral trajectory, Guidance, GUIDANCE, 200, for guiding, in the lateral and vertical planes, the aircraft on its 3D trajectory, while optimizing the speed, Digital data link DATALINK, 180, for communicating with the control centres, the infrastructures on the ground of the aircraft operators and of the other aircraft.

From the flight plan FPLN defined by the pilot, a lateral trajectory is determined as a function of the geometry between the waypoints. From this lateral trajectory, a prediction function PRED defines an optimized vertical profile taking into account any constraints of altitude, of speed and of time. For this, the FMS system has performance tables PERFDB available, which define the modelling of the aerodynamics and of the engines. The prediction function PRED implements the equations of the aircraft dynamics. These equations are based numerically on values contained in the performance tables for computing drag, lift and thrust. By double integration, the speed vector and the position vector of the aircraft are deduced therefrom.

The taking into account of the meteorological conditions and changes thereof is added to the complexity of the computation of a flight trajectory. FIGS. 2a and 2b represent a great circle trajectory 10 between a point A and a point B, the x axis and the y axis corresponding respectively to the latitude and the longitude. The meteorological conditions in the environment of the trajectory are represented by means of a meshing M; the direction and the length of the arrows at each node of the meshing M illustrating the direction and the intensity of the wind vector at this node. Since the wind is not constant over the journey, the great circle trajectory 10, the geometrically shortest trajectory for linking A and B, does not prove to be the most economical in terms of fuel consumption and/or the fastest. A global trajectory optimization computation, such as dynamic programming for example, makes it possible to construct a trajectory 11 for linking the point A and the point B in a way that it is optimized, in terms of fuel consumption and/or time. Such a computation of a trajectory optimized as a function of the meteorological conditions requires significant computation resources and a lengthy computation time. This computation can be done in a computation station on the ground, but it is relatively unsuited to use in an embedded flight management system.

Enriching the trajectory computation of the embedded flight management systems of FMS type has been envisaged, by proposing means for diverting an aircraft from its trajectory on the basis of wind information. Thus, from the applicant, the patent document published under the reference FR2939505 is known, describing an embedded lateral trajectory optimization solution that relies on a local modification of the flight plan. The diversion is placed on the DIRTO function known to those skilled in the art, and described in the ARINC 702 standard. The trajectory is modified relative to the initial trajectory by adding a diversion point replacing a series of waypoints in the flight plan. The use of the DIRTO function necessarily restricts the complexity of the representation of the lateral trajectory to be followed. This implementation does not guarantee obtaining an optimal trajectory in terms of fuel consumption and/or time.

It therefore remains desirable to have effective navigation aid means available for adapting, on board the aircraft, a flight trajectory by making it possible to take account of a change in the meteorological conditions in order to optimize the cost of a path.

SUMMARY OF THE INVENTION

The subject of the present invention is a navigation aid method, executed by a flight management system and intended to determine an improved trajectory between a point of departure A and a point of arrival B as a function of a trajectory cost, comprising the steps consisting in:

determining a grid of nodes P within an area of predetermined dimensions and comprising the points of departure A and of arrival B, loading meteorological data at said nodes P, determining, for each node P, an average instantaneous cost from a first instantaneous cost that is a function of a ground speed of the aircraft taking into account the meteorological data loaded at the node P concerned, and from a second instantaneous cost that is a function of a ground speed of the aircraft that does not take into account the loaded meteorological data, determining a length of a trajectory passing through said node P and arriving at the point of arrival B, determining a cost grid assigning, at each of the nodes P of the grid, a local cost determined from the average instantaneous cost and said length, determining an improved trajectory from the cost grid, graphically representing the improved trajectory and/or the cost grid to a crew.

Preferentially, the meteorological data comprise a wind vector and a temperature.

Advantageously, the local cost is equal to the product of the average instantaneous cost and of said length.

According to a variant, the length taken into account for the determination of the local cost corresponds to the sum of the great circle distances between the point of departure A and said node P and between said node P and the point of arrival B.

Advantageously, the local cost is determined by the formula:

$$C1 = \bar{\tau} \cdot (a+b)$$

with $\bar{\tau}$ average instantaneous cost a great circle distance between the point A and the node P b great circle distance between the node P and the point B.

According to another variant, the length taken into account for the determination of the local cost corresponds to the great circle distance between said node and the point of arrival.

Advantageously, the local cost is determined by the formula:

$$C2 = \bar{\tau} \cdot b$$

Preferentially, the average instantaneous cost is defined as a weighted sum of the first and second instantaneous costs, with a predetermined weighting coefficient making it possible to parameterize the influence of the meteorological data in the computation of the average instantaneous cost, according to the formula:

$$\bar{\tau} = w \cdot \tau 1 + (1-w) \cdot \tau 2$$

with:

$\bar{\tau}$ average instantaneous cost w weighting coefficient between 0 and 1

$\tau_1$ first instantaneous cost $\tau_2$ second instantaneous cost.

According to a first embodiment, the computation of the first and second instantaneous costs is determined at said node P from the simplified instantaneous cost formula:

$$\tau = \frac{1}{GS} = \frac{1}{TAS \cdot \cos(d) + \text{Wind} \cdot \cos(a)}$$

with

GS: ground speed of the aircraft

TAS: air speed of the aircraft as a function of the temperature T

Wind: wind vector d: angle between the ground speed and the air speed a: angle between the ground speed and the wind vector.

The first instantaneous cost is determined by said simplified formula with an air speed and meteorological conditions comprising a wind vector and a temperature determined at the node P, and the second instantaneous cost is computed by said simplified formula, with a zero wind vector, and a standard temperature at the node P and a ground speed equal to a predetermined air speed.

According to a second embodiment, the computation of the first and second instantaneous costs is determined at said node P from the general instantaneous cost formula:

$$\tau = \frac{FF + CI}{GS} = \frac{FF + CI}{TAS \cdot \cos(d) + \text{Wind} \cdot \cos(a)}$$

with

FF: fuel flow rate per hour

CI: Cost Index

GS: ground speed of the aircraft

TAS: air speed of the aircraft as a function of the temperature T

Wind: wind vector d: angle between the ground speed and the air speed a: angle between the ground speed and the wind vector.

The first instantaneous cost is determined by said general formula with an air speed and meteorological conditions comprising a wind vector and a temperature computed at the node P, and the second instantaneous cost is computed by said general formula, with a zero wind, a standard temperature at the node P and a ground speed equal to a predetermined air speed.

According to an option, the improved trajectory is determined by the flight management system as the trajectory minimizing the local costs over all of the trajectory.

According to another option, the improved trajectory is determined by the crew from the representation graphic of the cost grid.

Advantageously, the cost grid is represented graphically in a form of a surface.

Preferentially, the cost grid is represented graphically in the form of iso-cost curves.

According to a variant, the graphic representation step comprises a substep consisting in determining and representing the current lines at right angles to the iso-cost lines on the cost grid.

BRIEF DESCRIPTION OF THE DRAWINGS

Other features, aims and advantages of the present invention will become apparent on reading the following detailed description and in light of the attached drawings given by way of nonlimiting examples and in which.

For the purposes of clarity, the same elements will bear the same references in the different figures.

DETAILED DESCRIPTION

The navigation aid method 300 according to the invention is intended to determine an improved trajectory (Ta) between a point of departure A and a point of arrival B, as a function of a trajectory cost. For this, the method according to the invention determines a cost grid, defining, at each of its nodes, a local cost of a trajectory passing through this node and going back to the point of arrival B.

The method is intended to be executed by a computer, preferably a flight management system of the aircraft. The term flight management system of the aircraft should be interpreted as any computer intended to assist in the navigation of the aircraft. For example, it may be a computer embedded in the aircraft, typically the FMS as described previously, or a laptop computer or a digital tablet, such as an electronic flight bag (EFB). It is also possible to envisage implementing the method on the ground for example, in an air traffic control or airline computation station.

A cost function $C_{global}$ of a trajectory between A and B is expressed according to the general formula:

$$C_{global} = \int_A^B \tau \cdot dx \quad (1)$$

With $\tau$ being the instantaneous cost computed at each point of the trajectory.

The instantaneous cost $\tau$ is a function of the ground speed GS of the aircraft at the point concerned. Later in the explanation, two variants of computation of the instantaneous cost from GS are described.

Figure 1:
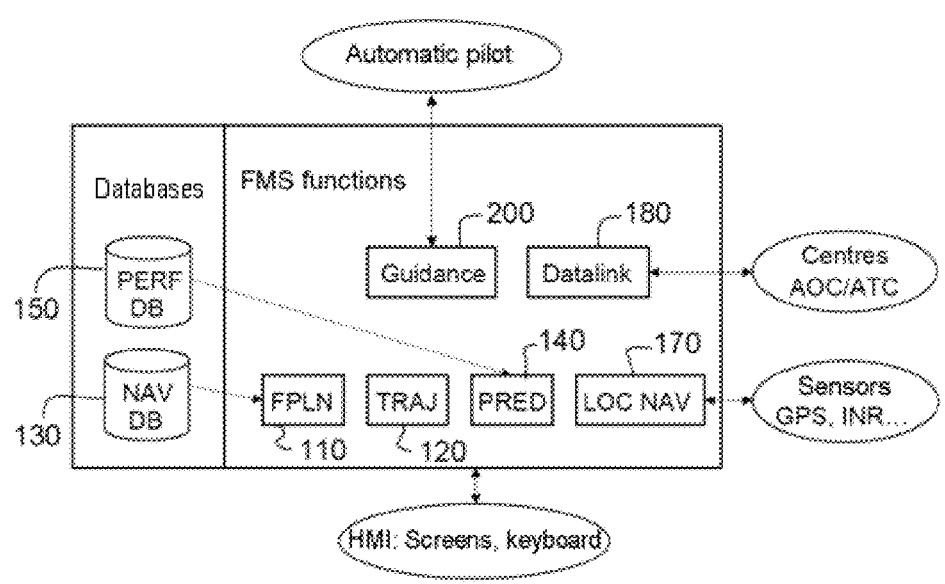
FIG. 1, already presented, represents a known navigation aid system, commonly called FMS.
Figure 2A:
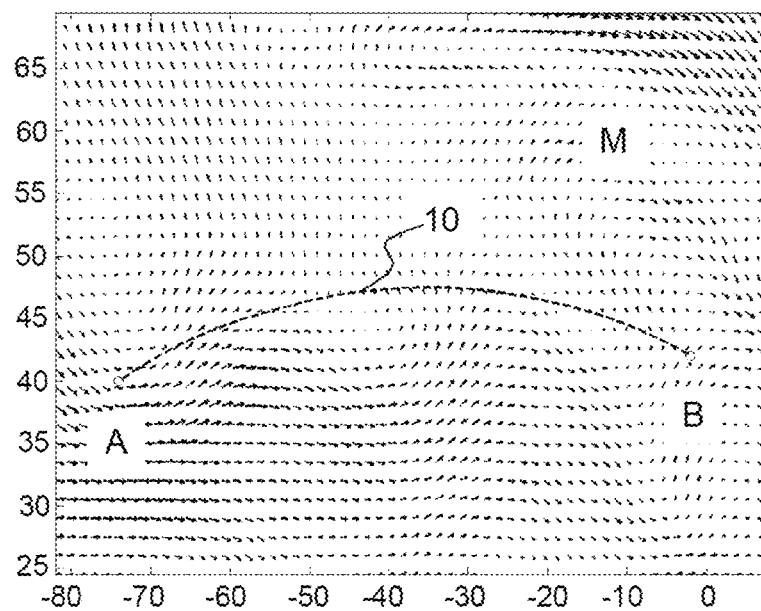
FIGS. 2a and 2b, already presented, illustrate the benefit of taking into account the meteorological conditions for the computation of a flight trajectory.
Figure 2B:
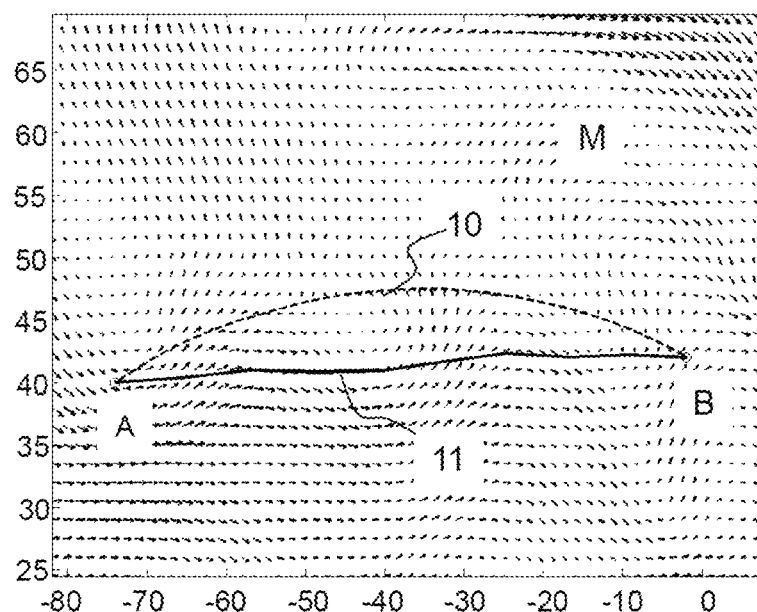
Figure 3:
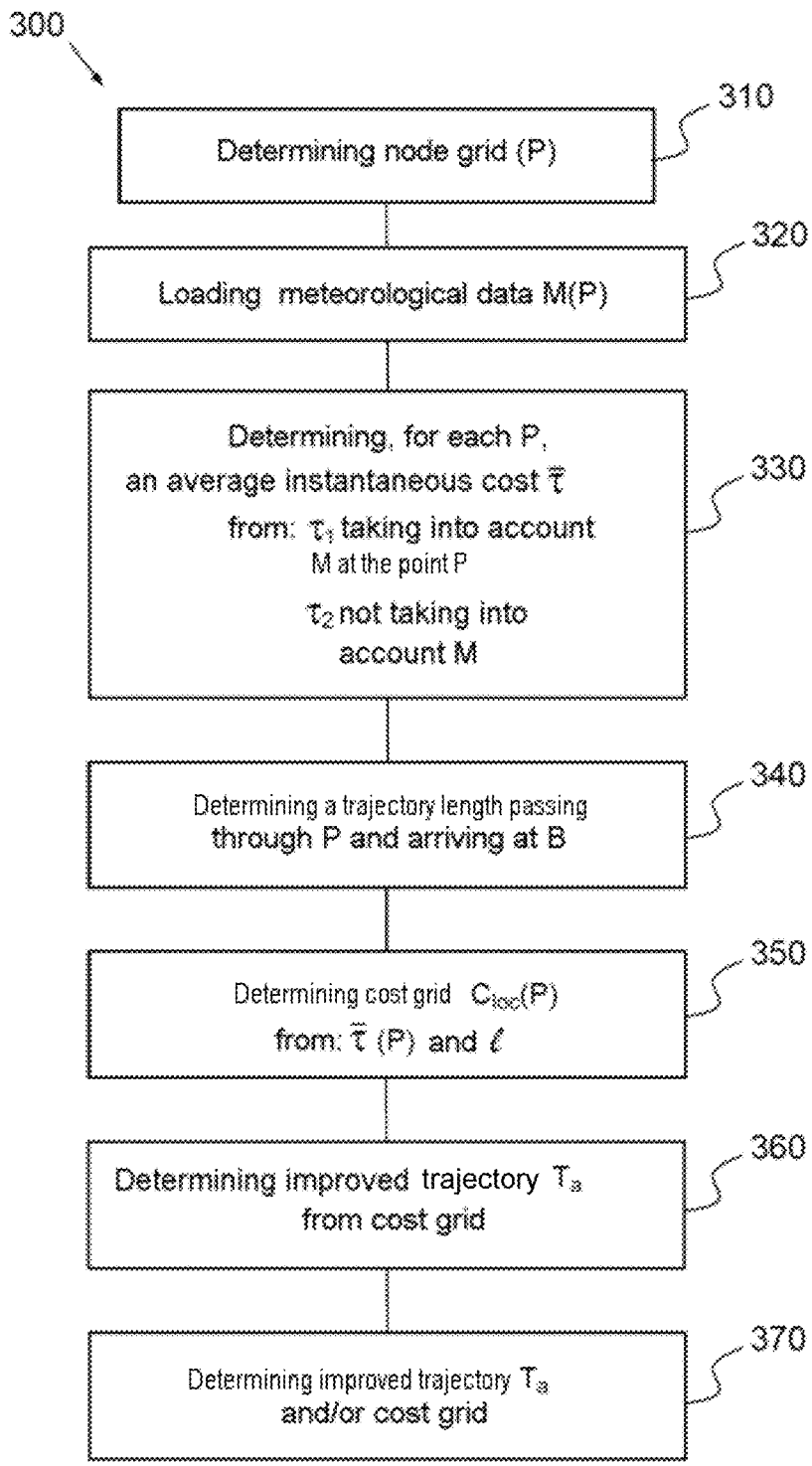
FIG. 3 illustrates the method according to the invention.
Figure 4:
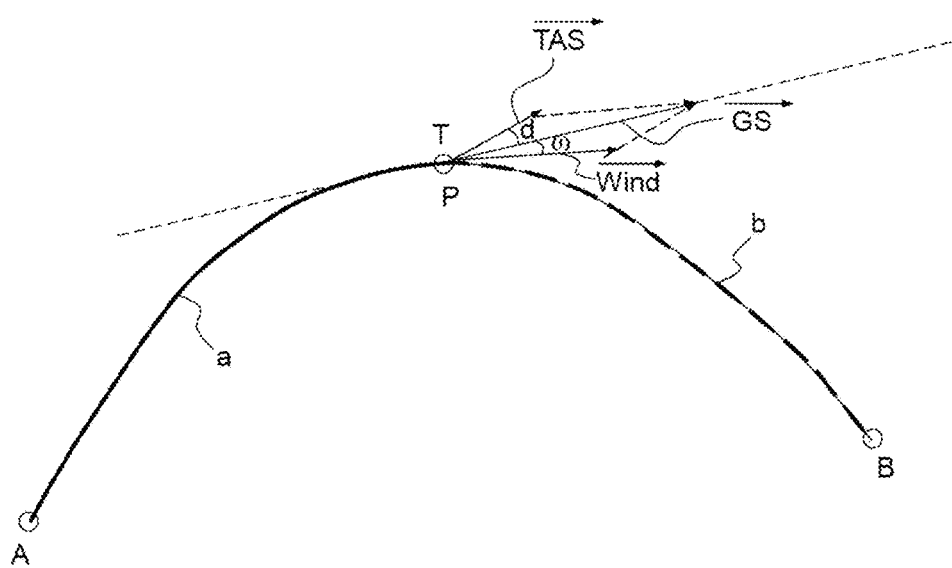
FIG. 4 illustrates vector concepts of air speed and ground speed at a point P of an aircraft trajectory between A and B.

The method according to the invention 300 illustrated by FIG. 3 determines a local cost $C_{loc}$ at each point P from the formula (1) and comprises the following steps:

Step 310 determines a grid of nodes P within an area 12 of predetermined dimensions comprising the points of departure A and of arrival B, preferably the area 12 is situated around a great circle trajectory linking the points A and B. The area 12 is determined by the crew or by the flight management system. The term grid should be understood to mean a set of points P in the broad sense, a particular form of which is a regular meshing.

The step 320 loads meteorological data M at the nodes P. In fact, little information on the meteorological conditions is generally available in the current flight management systems, and the method according to the invention therefore comprises this first step consisting in loading these data. These meteorological data comprise, for example, information on the wind (strength, direction) or on the atmospheric temperature. In one possible implementation of the invention, the meteorological conditions are loaded and stored in the flight management system in the form of a four-dimensional meshing covering the area 12 of predetermined dimensions around a great circle trajectory linking the point of departure A and the point of arrival B.

Advantageously, the meteorological data M comprise the values of the wind W and temperature T vectors at each point P of the grid concerned.

Then, a step 330 determines, for each node P, an average instantaneous cost from a first instantaneous cost $\tau 1$ that is a function of a ground speed of the aircraft taking into account the meteorological data M loaded at the node P concerned, and from a second instantaneous cost $\tau 2$ that is a function of a ground speed of the aircraft that does not take into account the loaded meteorological data.

The step 330 therefore makes it possible to determine $\bar{\tau}$ by taking into account knowledge of the meteorological data (wind, temperature) at the point P via $\tau 1$, and ignorance of the optimal trajectory passing through P and thus of the meteorological data over this trajectory between A and P and between P and B via $\tau 2$. $\tau 2$ corresponds to the instantaneous cost for a zero wind and the standard temperature at the node P.

Considering only $\tau 1$ makes it possible to favour the use of the favourable meteorological conditions, notably tailwind. Considering only $\tau 2$ makes it possible to reduce the length of the trajectory. Considering $\tau 1$ and $\tau 2$ makes it possible to obtain a compromise between favouring the use of the favourable meteorological conditions (notably the tailwind) and reducing the length of the trajectory.

A step 340 determines a length l of a trajectory passing through the node P and arriving at the point of arrival B.

In a step 350, the method determines a cost grid assigning, at each of the nodes P of the grid, a local cost $C_{loc}$ determined from the average instantaneous cost $\bar{\tau}$ and from the length l corresponding to the length of the trajectory concerned for the computation of the local cost.

Preferentially, the local cost $C_{loc}$ at P corresponds to an estimation of the global cost $C_{global}$ of a trajectory passing through the node P and arriving at the point of arrival B. The local cost is computed by application of the formula (1) by considering that the average instantaneous cost $\bar{\tau}$ applies over all the trajectory passing through the node P and arriving at the point of arrival B (it can therefore be taken out of the whole).

$C_{loc}$ is defined as the product of the average instantaneous cost $\bar{\tau}$ at P and the length l.

$$C_{loc} = \bar{\tau} * l$$

A step 360 determines an improved trajectory Ta from the cost grid determined in the step 350.

A step 370 graphically represents the improved trajectory Ta and/or the cost grid to a crew.

According to a variant, the method according to the invention also comprises a step of interrogation of the pilot, in order to determine whether the pilot wants or not to insert the improved trajectory determined in the step 360 into a temporary flight plan.

Once the cost grid is determined, a first variant is to use it as support for the computation of an improved trajectory Ta. The computation is performed by the flight management system, the improved trajectory is the trajectory from A to B that minimizes the local costs computed at a high number of points P of the area 12. Numerous algorithms that make use of the local cost grid and minimize the global cost can be envisaged such as algorithms based on systematic listing or on the gradients method. Examples are given later.

A second variant is for the improved trajectory to be determined by the crew, from visual information consisting of the graphic representation of the cost grid. Particular graphic representations described later make it possible for the crew to visually and intuitively establish the favourable routes to be followed as a function of the meteorological conditions, and to try to minimize the cost represented.

It should be noted that it is envisaged to apply the method according to the invention in the widespread case in which the flight trajectory is split between a lateral trajectory and a vertical trajectory. To optimize the lateral trajectory, the method then determines a cost grid in the form of a two-dimensional surface, the graphic representation of which allows for an intuitive reading of the favourable routes. This application of the method for optimizing a lateral trajectory is however nonlimiting on the invention, which more widely covers the optimization of a flight trajectory between two points in the three dimensions of space.

Two local cost computation methods are described hereinbelow. The method according to the invention can implement one of these two methods, or both methods by allowing the possibility of a selection by the crew at the time of computation. These computation methods have as common input data the meteorological information (wind, temperature) (and, if appropriate, the initial Cost value and the aircraft performance database as explained later).

According to a first computation method, the length e considered is the sum of a and b:

$$l = a + b$$

with
- a the length of the great circle trajectory from A to P and,
- b the length of the great circle trajectory from P to B, as illustrated in FIG. 3.

Preferentially in this case, the local cost C1 is determined by the formula:

$$C1 = \bar{\tau} \cdot (a+b)$$

with
- $\bar{\tau}$ average instantaneous cost at P,
- a great circle distance between the point A and the node P
- b great circle distance between the node P and the point B.

According to a second method, the length considered is only the length b from P to B.

Preferentially in this case, the local cost C2 is determined by the formula:

$$C2 = \bar{\tau} \cdot b$$

The respective advantages of the two variants C1 and C2 are explained later.

There now follows a description, through examples, of the methods for computing the average instantaneous cost $\bar{\tau}$ and the first and second instantaneous costs.

Preferentially, the average instantaneous cost $\bar{\tau}$ is defined as a weighted sum of the first $\tau_1$ and second $\tau_2$ instantaneous costs, with a predetermined weighting coefficient w making it possible to parameterize the influence of the meteorological data M in the computation of the average instantaneous cost, according to the formula:

$$\bar{\tau} = w \cdot \tau 1 + (1-w) \cdot \tau 2 \quad (2)$$

With:
- $\bar{\tau}$ average instantaneous cost
- w weighting coefficient between 0 and 1
- $\tau_1$ first instantaneous cost
- $\tau_2$ second instantaneous cost.

According to a first embodiment, the aim is to obtain the trajectory that optimizes only the flight time t, for an air speed TAS that is constant (or in other words, a constant Mach/CAS ratio). The cost corresponds here to a time and the aim is to minimize the expression:

$$t = \int_A^B \frac{1}{GS} dx \quad (3)$$

The instantaneous cost is equal to:

$$\tau = \frac{1}{GS} \quad (4)$$

At a point, the ground speed GS is equal to the vector sum of the air speed TAS and of the wind vector Wind, as illustrated in FIG. 3. The GS direction is known and equal to the tangent to the trajectory concerned, here the great circle trajectory between P and B.

The following is deduced therefrom:

$$\tau = \frac{1}{GS} = \frac{1}{TAS \cdot \cos(d) + \text{Wind} \cdot \cos(w)} \quad (5)$$

with
- GS: ground speed of the aircraft
- TAS: air speed of the aircraft that is a function of the temperature T
- Wind: wind vector
- d: angle between the ground speed and the air speed
- w: angle between the ground speed and the wind vector.

The air speed of the aircraft depends on the temperature T and on a relative speed datum called Mach number, entered by the pilot or chosen by the system as a function of the flight conditions of the aircraft, according to the formula:

$$TAS = \text{Mach}\sqrt{\gamma \cdot RT} \quad (6)$$

With $\gamma$ being the isentropic coefficient of the air and R the perfect gas constant.

From these formulae, $\tau_1$ and $\tau_2$ are computed (in s/m).

$\tau_1$ corresponds to the instantaneous cost value that takes into account the wind Wind and the temperature T at the point P:

$$\tau 1 = \tau_{Wind=Wind_P, T=T_P} = \frac{1}{\text{Mach}\sqrt{\gamma \cdot R \cdot T_P} \cdot \cos(d) + Wind_P \cdot \cos(a)}$$

$\tau_2$ corresponds to the instantaneous cost value taking into account a zero wind (ground air speed equal to air speed) and a standard temperature corresponding for example to the temperature at the altitude of the node P:

$$\tau 2 = \tau_{Wind=0, T=T_{STD}} = \frac{1}{TAS} = \frac{1}{\text{Mach}\sqrt{\gamma \cdot R \cdot T_{STD}}}$$

The corresponding standard temperature at the altitude of the node P is computed according to the standard temperature and pressure model defined by the International Civil Aviation Organization:
at sea level: +15° C.,
from 0 to 11 km: dT/dz=−6.5° C.km$^{-1}$,
from 11 km to 20 km: dT/dz=0 and T=−56.5° C.

The wind W and T data at P are loaded, the Mach datum is predetermined, the angle w between GS (tangent to the trajectory) and W is easily computed, and the angle d between TAS and GS is easily computed from the GS and W vectors and by vector sum.

This first embodiment of the computation of $\tau_1$ and $\tau_2$ is very simple and rapid and does not require information contained in the aircraft performance database.

The computation of the local cost grid is performed only upon the updating of the meteorological data onboard, and a grid can be used for any pair of points A to B of the area 12.

Figure 5A:
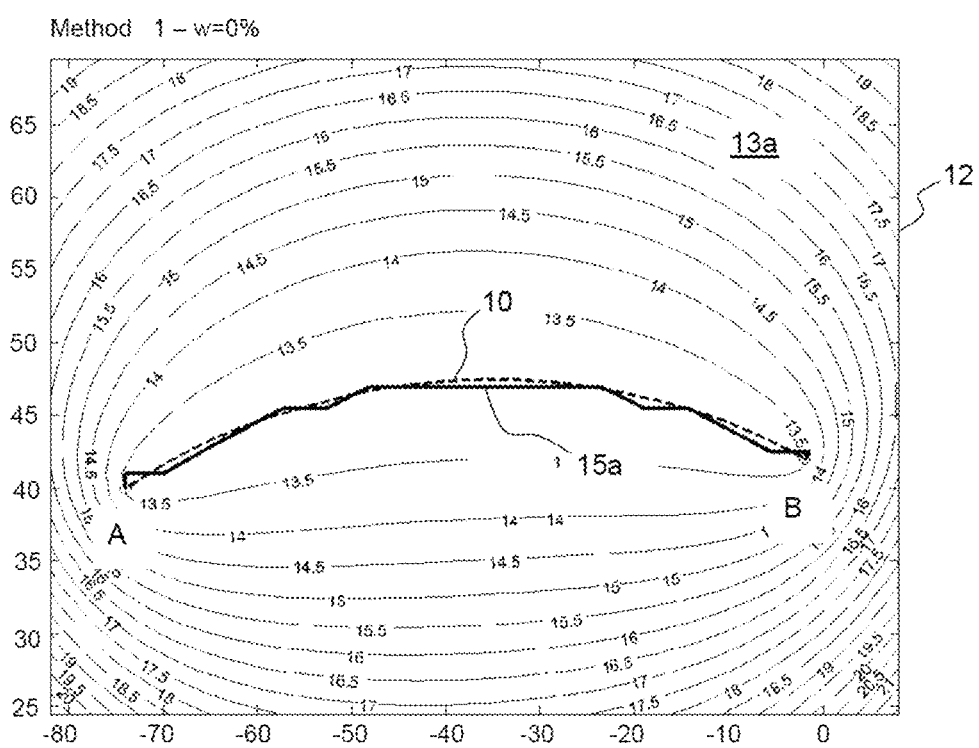
FIGS. 5a, 5b and 5c illustrate the computation of a cost grid and of an optimized trajectory by means of a first method for computing the local cost C1 and according to the first embodiment of the method according to the invention (simplified formula), respectively by assigning a zero, intermediary and significant weight to the meteorological conditions in the trajectory computation.
Figure 5B:
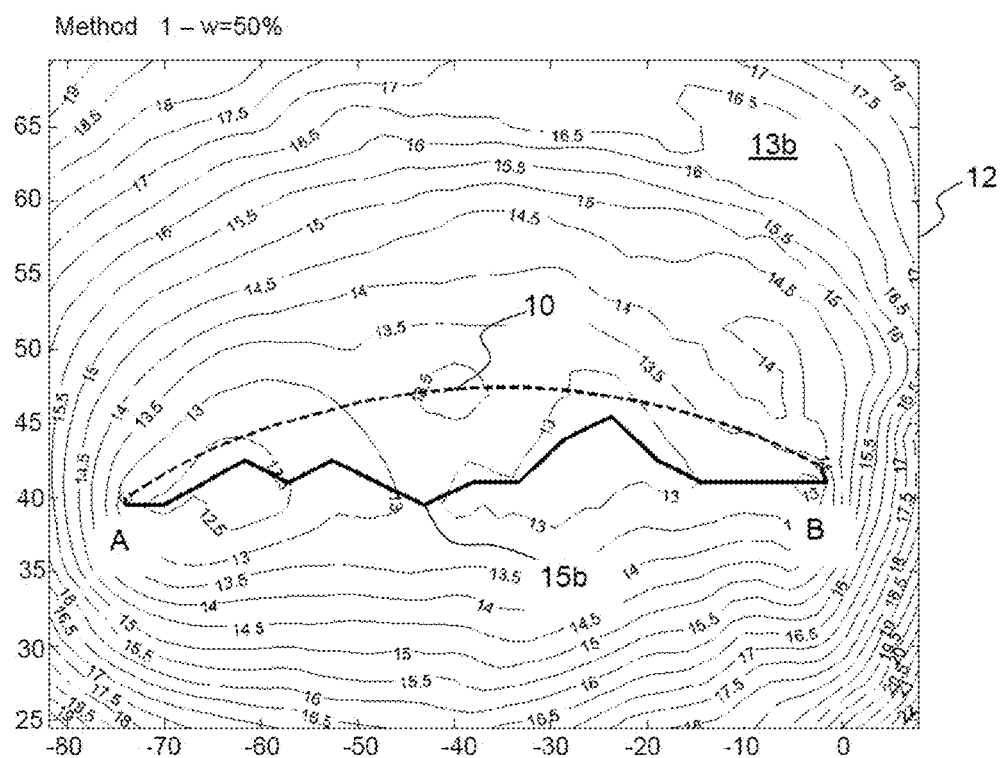
Figure 5C:
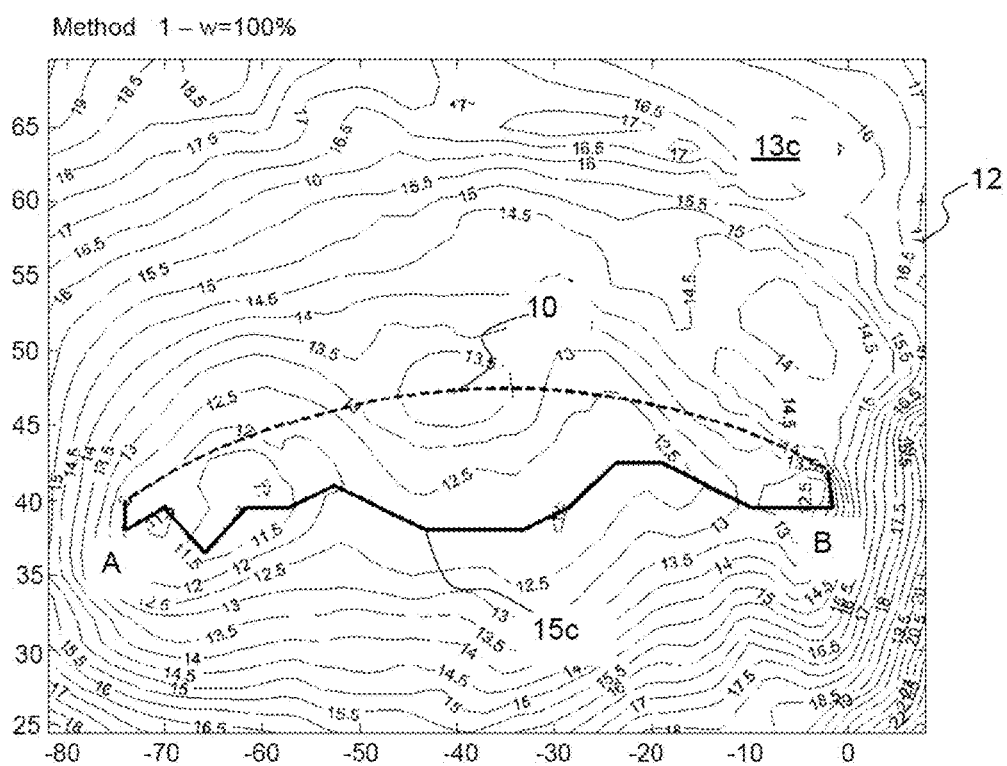

A first example is illustrated in FIGS. 5a, 5b, 5c, with a computation of $\bar{\tau}$ from the formula (2), the 3 figures corresponding respectively to a coefficient w=0%, 50% and 100%, with $\tau_1$ and $\tau_2$ computed with the above formulae, and with a computation of C1 (P):

$$C1(P) = \bar{\tau} \cdot (a+b)$$

The computation of the local cost $C_1$ at each of the nodes P makes it possible to establish the cost grid. This cost grid is established in an area 12 of predetermined dimensions around the great circle trajectory. The method can comprise a parameterizing step that enables the crew to enter the limit dimensions of the area. A step of redimensioning of the computation area is also envisaged, for example to reduce the area of exploration after a first cost grid computation has made it possible to target the areas of interest. The cost grid can be determined on the ground before take-off, then be updated at regular intervals as a function of the meteorological data received by the flight management system.

According to one embodiment, the method comprises a step 370 of display of the cost grid to the crew. The graphic representation of the cost grid can take various forms. In the case of a two-dimensional cost grid, making it possible to optimize a lateral trajectory, the cost grid is preferentially displayed in the form of a surface. The reliefs of the cost surface, for example represented graphically in the form of iso-cost level curves, allow for intuitive visualization of the favourable areas, and constitute a decision-making aid for the pilot, who then intuitively determines, in the step 360, an improved trajectory, according to various interfaces with the display.

According to one embodiment, the method determines, by computation at 360, an optimized trajectory relying on the cost grid established previously. Typically, the optimized trajectory can be determined by means of a "snake" type function that makes it possible to follow the valleys of the surface to link the point A and the point B.

FIGS. 5a, 5b and 5c represent the cost grid obtained by computation for three values of the weighting coefficient w, respectively 0%, 50% and 100%. The cost grid is embodied by the local iso-value cost lines on the surface. An optimized trajectory determined by computation relying on the cost grid is represented. FIG. 5a (w=0%) illustrates the case where the influence of the wind meteorological conditions is disregarded, the optimized trajectory 15a is logically close to the great circle trajectory. FIG. 5c (w=100%) illustrates the case where the influence of the meteorological conditions is strongest, the optimized trajectory 15c is clearly distinguished from the great circle trajectory. The higher the value of the weighting coefficient w, the more the optimized trajectory seeks the favourable wind areas. The result thereof is a more choppy trajectory, comprising numerous changes of direction. FIG. 5b, and the optimized trajectory 15b, represents an intermediate situation.

Figure 6A:
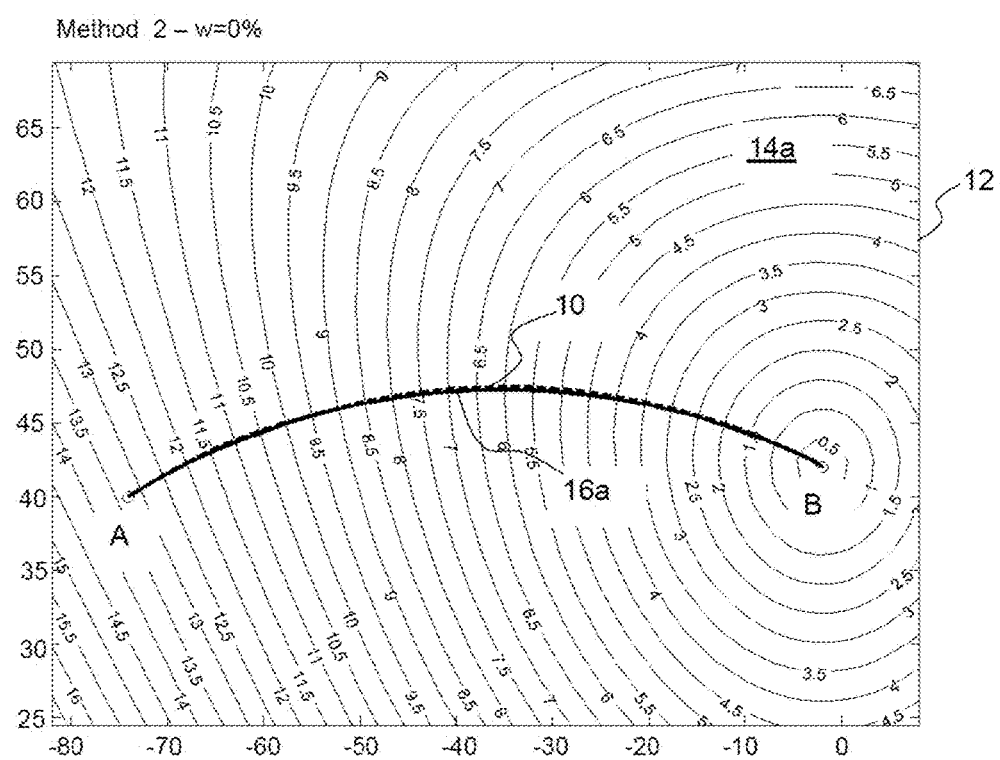
FIGS. 6a, 6b and 6c illustrate the computation of a cost grid and of an optimized trajectory by means of a second method for computing the local cost C2 and according to the first embodiment of the method according to the invention (simplified formula), respectively by assigning a zero, intermediate and significant weight to the meteorological conditions in the optimized trajectory computation.
Figure 6B:
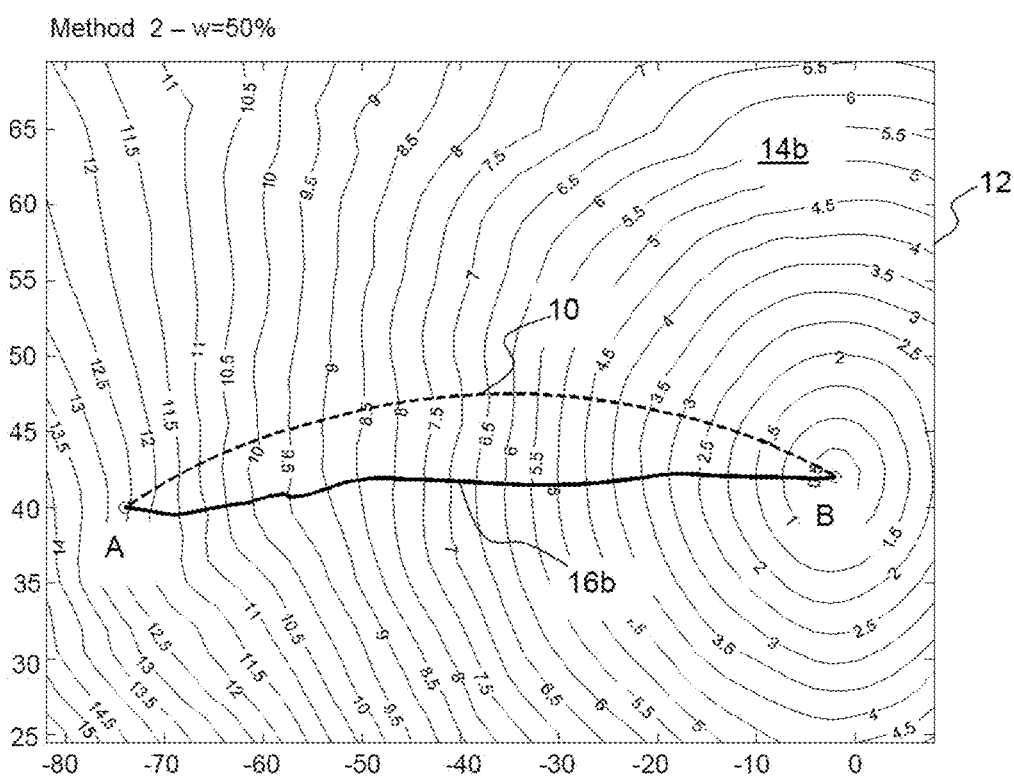
Figure 6C:
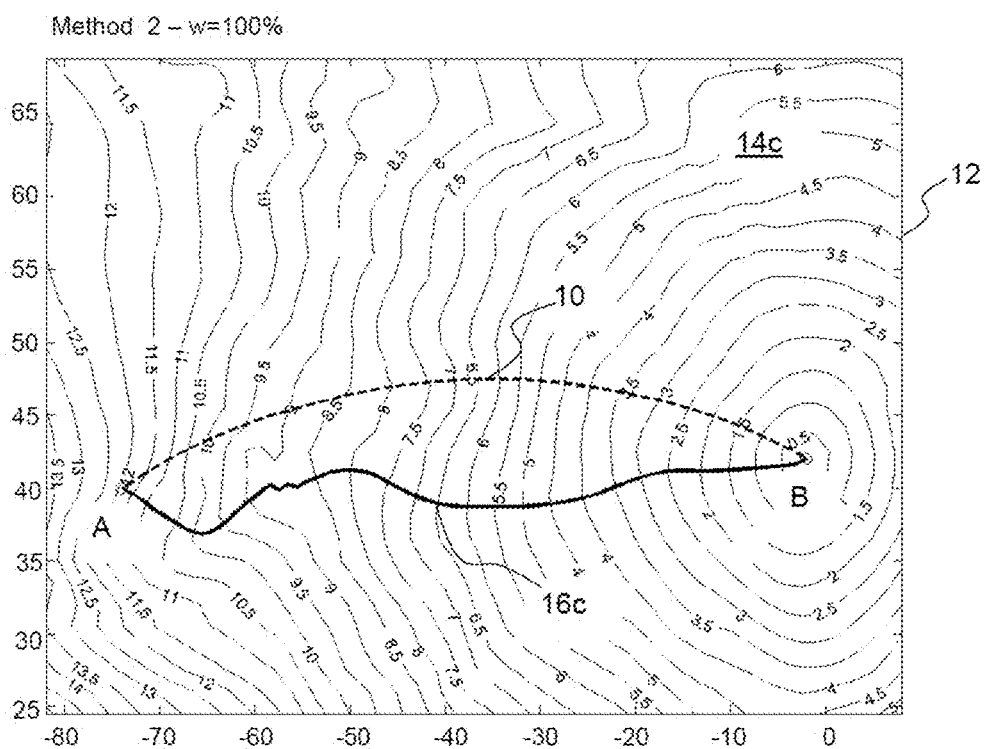

A second exemplary cost grid computation is illustrated in FIGS. 6a, 6b, 6c, with a computation of $\bar{\tau}$ from the formula (2), the 3 figures corresponding respectively to a coefficient w=0%, 50% and 100%, with $\tau_1$ and $\tau_2$ computed with the above formulae, and with a computation of the local cost C2(P):

$$C2(P) = \bar{\tau} \cdot b$$

FIGS. 6a, 6b and 6c represent the local cost iso-values on the cost grid, the great circle trajectory 10 and the trajectory optimized by computation respectively referenced 16a, 16b and 16c.

Contrary to the first example, the local cost at each node P of the grid does not illustrate the cost of a trajectory between the points A and B passing through the node P, but illustrates the cost of a trajectory that makes it possible to get back to the point of arrival B from the node P. The cost surface presents a minimum at the point of arrival B. This second exemplary computation of the local cost makes it possible to intuitively visualize, on the cost grid, the favourable trajectories that make it possible to get back to the point of arrival B.

Figure 7A:
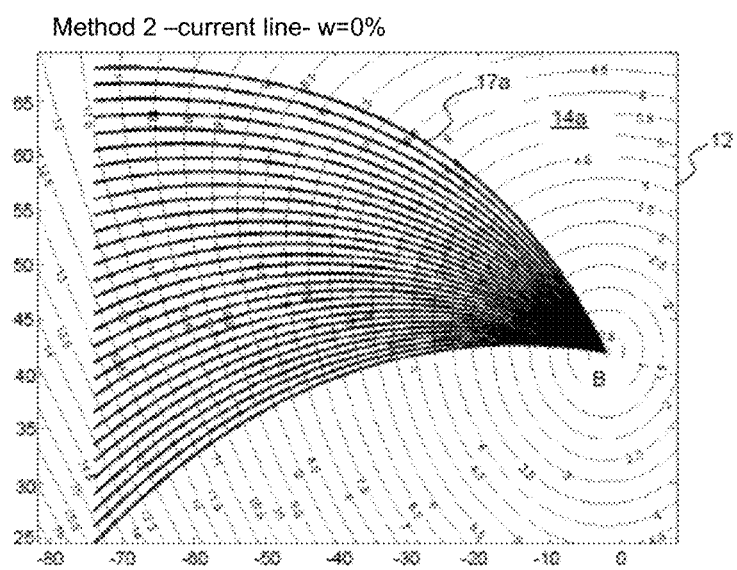
FIGS. 7a, 7b and 7c illustrate the computation of current lines associated with the second method for computing the local cost C2, respectively by assigning a zero, intermediate and significant weight to the meteorological conditions in the optimized trajectory computation.
Figure 7B:
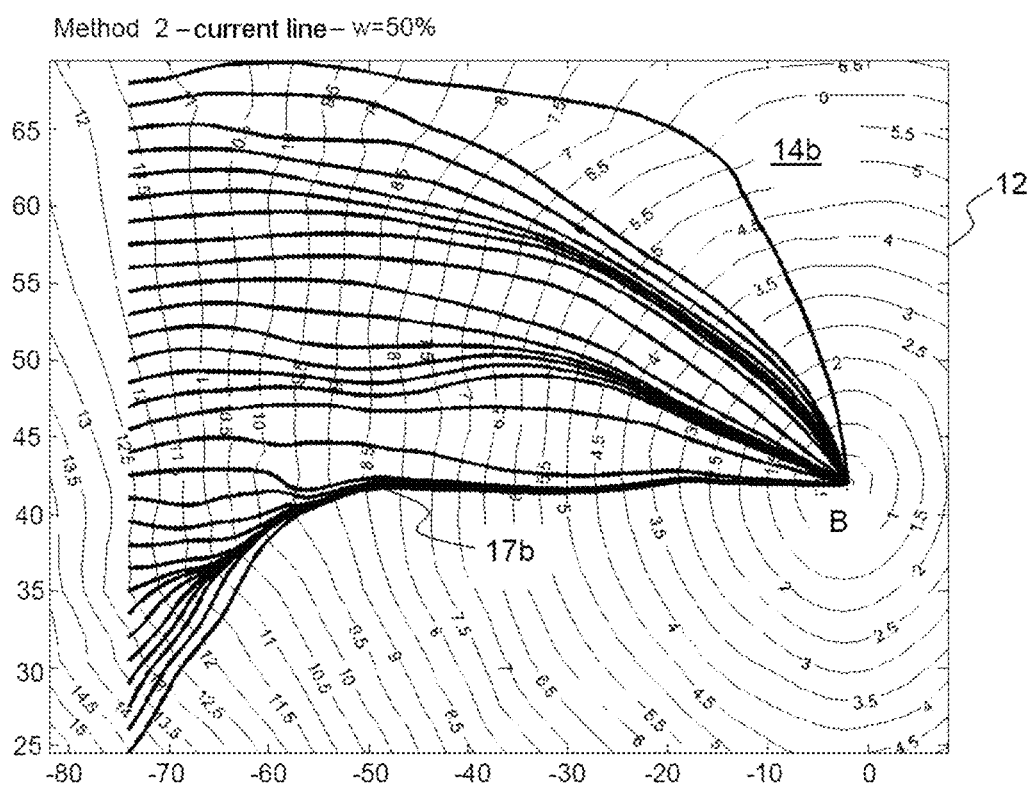
Figure 7C:
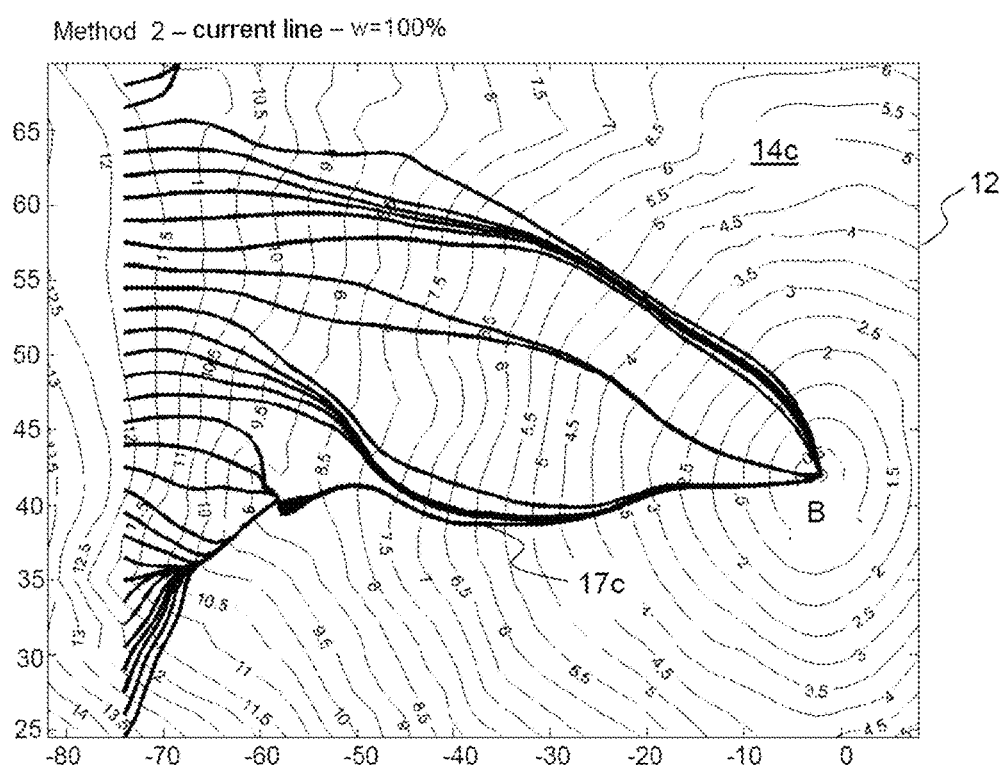

From these cost grids, FIGS. 7a, 7b and 7c illustrate current lines corresponding to the curves at right angles to the iso-cost lines respectively referenced 17a, 17b and 17c. Each curve starts from a predetermined point of departure. Thus, according to an option of the method, the step 370 of display of the cost grid comprises a substep consisting in determining and representing the current lines at right angles to the iso-cost lines on the cost grid. It can be seen that the increase in influence of the meteorological conditions (that is to say for increasing values of the weighting coefficient w) makes it possible to identify current lines that differ from the great circle trajectory.

Another benefit of this second exemplary local cost C2 computation is that it allows for a simple computation of an optimized trajectory between the points A and B. A trajectory computation by the gradients method can, for example, be easily implemented.

Another graphic representation variant is to graphically represent the cost grid in the form of a colour image.

A first embodiment previously described consisted in seeking a trajectory that optimizes only the flight time from the formula (3). A second embodiment of the method consists in seeking a compromise between the costs linked to the flight time and the cost of the fuel. Conventionally, the airlines use a weighting factor, known by the term Cost Index, that makes it possible to compute a minimum cost per trip by expressing the search for this compromise.

More specifically, the operating costs of a flight for an airline can be expressed by the following formula:

$$DOC = P_c * c + P_t * t + C_f$$

in which DOC (Direct Operating Cost) represents the direct operating costs, $P_c$ represents the price of fuel, c the consumption of the step, $P_t$ the hourly cost of the flight, t the flight time on the step concerned, and $C_f$ represents the fixed costs.

Minimizing the costs of the flight means minimizing the variable costs, that is to say:

$$P_c * c + P_t * t$$

Since the price of the fuel is fixed and determined at the time of the filling of the tanks of the aircraft, the cost function to be optimized can be expressed by the following relationship:

$$\tau = \frac{DOC}{P_c} = c + \frac{P_t}{P_c} * t \qquad (7)$$

It is thus that the Cost Index coefficient (CI) is defined:

$$CI = \frac{P_t}{P_c} \qquad (8)$$

The Cost Index links the cost of the time and the cost of the fuel. It is determined by each airline as a function of its economic policy. The use of this coefficient CI is widespread in the aeronautical industry. The value of the Cost Index constitutes in particular an input datum for the management systems FMS, taken into account in the performance computations. Hereinafter in the document, the designations "cost criterion", CI or Cost Index are equivalent and refer to the coefficient according to the formula (8).

The second embodiment makes it possible to parameterize the local cost as a function of the Cost Index; the local cost value at each node is therefore matched to the policy of the airline. The cost value depends on the meteorological conditions.

The instantaneous cost expressed in kilograms per nautical mile can be written, starting from the equation (7) already presented, in the following form:

$$\tau = \frac{1}{SR} + CI * \frac{1}{GS} \qquad (9)$$

in which:
GS, the acronym for Ground Speed, represents the ground speed (that is to say the air speed plus the wind speed),
SR, the acronym for Specific Range, represents the specific action radius (that is to say, the distance travelled per unit of fuel expressed in NM/kg or NM/tonne).

This formula is to be compared to the formula (5) of the first embodiment, which takes into account only GS for the computation of the cost $\tau$.

The specific action radius SR can be expressed in the following form:

$$SR_{(ground)} = \frac{D}{c} = \frac{GS}{FF \text{(fuel flow rate per hour)}}$$

in which FF represents the fuel flow rate per hour.

These concepts known to those skilled in the art are not described in detail here.

Thus, in this second embodiment of the method according to the invention, optimizing the cost of the trajectory between the point A and the point B therefore means minimizing the following mathematical function:

$$\int_A^B \tau \cdot dx = \int_A^B \left( \frac{FF}{GS} + CI * \frac{1}{GS} \right) dx \qquad (10)$$

hence:

$$\tau = \frac{FF + CI}{GS} = \frac{FF + CI}{TAS \cdot \cos(d) + \text{Wind} \cdot \cos(a)} \qquad (11)$$

$$\tau = \frac{FF + CI}{\text{Mach} \sqrt{\gamma \cdot R \cdot T} \cdot \cos(d) + \text{Wind} \cdot \cos(a)}$$

CI entered by the pilot or the system, and determined by the airline
FF: fuel flow rate per hour
and, as previously:
GS: ground speed of the aircraft
TAS: air speed of the aircraft as a function of the temperature T
Wind: wind vector
d: angle between the ground speed and the air speed
w: angle between the ground speed and the wind vector
γ: isentropic coefficient of the air and R perfect gas constant
Mach: relative speed entered by the pilot or determined by the flight management system.
τ is measured here in kg/m
From the formula (11), $\tau_1$ and $\tau_2$ are computed (in kg/m)
$\tau_1$ corresponds to the instantaneous cost value taking into account the wind Wind and the temperature T at the point P, and $\tau_2$ corresponds to the instantaneous cost value taking into account a zero wind (ground air speed equal to air speed) and the corresponding standard temperature at the altitude of the node P:

$$\tau 2 = \tau_{Wind=0, T=T_{STD}} = \frac{FF_{Wind=0, T=T_{STD}} + CI}{Mach_{Wind=0, T=T_{STD}} \sqrt{\gamma \cdot R \cdot T_{STD}}}$$

$$\tau 1 = \tau_{Wind=Windp, T=T_P} =$$
$$\frac{FF_{Wind=Windp, T=T_P} + CI}{Mach_{Wind=Windp, T=T_P} \sqrt{\gamma \cdot R \cdot T_P} \cdot \cos(d) + Windp \cdot \cos(w)}$$

Mach(P) is a relative speed entered by the pilot or determined by the flight management system at the point P.

FF(P) is the fuel flow rate per hour at the point P. These two quantities are computed by the system at the point P according to a method known from the prior art (by invoking the aircraft performance data).

The values of the angles w and d are determined from the vector equality illustrated in FIG. 3.

As in the first embodiment, at each node P of the cost grid, the method determines the local cost $C_{loc}$, for example $C_1$ and/or C2 from $\bar{\tau}$, obtained from the computation of $\tau_1$ and $\tau_2$. All the computation and graphic representation variants described for the first embodiment apply to the second embodiment, only the method for computing $\tau_1$ and $\tau_2$ being different.

A flight management system intended to determine an improved trajectory between a point of departure (A) and a point of arrival (B) as a function of a trajectory cost, comprising a flight management computer and lines of computer code intended to be executed on said computer, said lines of computer code comprising instructions making it possible to perform the computation steps of the navigation aid method according to the invention.

This new function can be incorporated into a flight management system, to improve or optimize the trajectory in flight.

According to a last aspect, the invention relates to a computer program product, the computer program comprising code instructions making it possible to perform the steps of the method according to the invention.

The method can be implemented from hardware and/or software elements. The method can be available as a computer program product on a computer-readable medium.

The method can be implemented on a system that can use one or more dedicated electronic circuits or a general-purpose circuit.

The technique of the method according to the invention can be implemented on a reprogrammable computation machine (a processor or a microcontroller for example) executing a program comprising a sequence of instructions, or on a dedicated computation machine (for example a set of logic gates like an FPGA or an ASIC, or any other hardware module).

The various modules of the system according to the invention can be implemented on one and the same processor or on one and the same circuits, or distributed over a number of processors or a number of circuit. The modules of the system according to the invention consist of computation means including a processor.

The reference to a computer program which, when run, performs any one of the functions described previously, is not limited to an application program running on a single host computer. On the contrary, the terms computer program and software are used here in a general sense to refer to any type of computer code (for example, application software, firmware, microcode, or any other form of computer instruction) which can be used to program one or more processors to implement aspects of the techniques described here.

The invention claimed is:

1. A navigation aid method, executed by a flight management system to determine an improved trajectory between a point of departure and a point of arrival as a function of a trajectory cost, comprising the steps of:
determining a grid of nodes within an area of predetermined dimensions and comprising the points of departure and of arrival,
loading meteorological data at said nodes,
determining, for each node of the grid of nodes, an average instantaneous cost from a first instantaneous cost that is a function of a predicted ground speed of an aircraft taking into account the meteorological data loaded at the node concerned, and from a second instantaneous cost that is a function of a predicted ground speed of the aircraft that does not take into account the loaded meteorological data,
determining a length of a trajectory passing through said node and arriving at the point of arrival,
determining a cost grid assigning, at each of the nodes of the cost grid, a local cost determined from the average instantaneous cost and said length,
determining the improved trajectory from said cost grid, graphically representing the improved trajectory and/or the cost grid to a crew.

2. The method according to claim 1, wherein the meteorological data comprise a wind vector and a temperature.

3. The method according to claim 1, wherein the local cost is equal to a product of said average instantaneous cost and of said length.

4. The method according to claim 1, wherein the length taken into account for the determination of the local cost corresponds to a sum of great circle distances between the point of departure and said node and between said node and the point of arrival.

5. The method according to claim 4, wherein the local cost is determined by the formula:

$$C1 = \bar{\tau} \cdot (a+b)$$

with
$\bar{\tau}$ average instantaneous cost,
a great circle distance between a point A and a node P, and
b great circle distance between the node P and the point B.

6. The method according to claim 1, wherein the length taken into account for the determination of the local cost corresponds to a great circle distance between said node and the point of arrival.

7. The method according to claim 6, wherein the local cost is determined by the formula:

$$C2 = \bar{\tau} \cdot b$$

with
$\bar{\tau}$ average instantaneous cost, and
b great circle distance between a node P and a point B.

8. The method according to claim 1, wherein the average instantaneous cost is defined as a weighted sum of the first and second instantaneous costs, with a predetermined weighting coefficient to parameterise an influence of the meteorological data in the determining of the average instantaneous cost, according to the formula:

$$\bar{\tau} = w \cdot \tau 1 + (1-w) \cdot \tau 2$$

$\bar{\tau}$ average instantaneous cost,
w weighting coefficient between 0 and 1,
$\tau_1$ first instantaneous cost, and
$\tau_2$ second instantaneous cost.

9. The method according to claim 1, wherein the first and second instantaneous costs are determined at said node from the simplified instantaneous cost formula:

$$\tau = \frac{1}{GS} = \frac{1}{TAS \cdot \cos(d) + \text{Wind} \cdot \cos(a)}$$

with
GS: ground speed of the aircraft,
TAS: air speed of the aircraft as a function of a temperature T,
Wind: wind vector,
d: angle between the ground speed and the air speed, and
a: angle between the ground speed and the wind vector,
and wherein the first instantaneous cost is determined by said simplified instantaneous cost formula with an air speed and meteorological conditions comprising a wind vector and a temperature determined at a node P, and the second instantaneous cost is determined by said simplified instantaneous cost formula, with a zero wind vector, a standard temperature at the node P and a ground speed equal to a predetermined air speed.

10. The method according to claim 1, wherein the first and second instantaneous costs are determined at said node from the general instantaneous cost formula:

$$\tau = \frac{FF + CI}{GS} = \frac{FF + CI}{TAS \cdot \cos(d) + \text{Wind} \cdot \cos(a)}$$

with
FF: fuel flow rate per hour,
CI: Cost Index,
GS: ground speed of the aircraft,
TAS: air speed of the aircraft as a function of a temperature T,
Wind: wind vector,
d: angle between the ground speed and the air speed, and
a: angle between the ground speed and the wind vector,
and wherein the first instantaneous cost is determined by said general instantaneous cost formula with an air speed and meteorological conditions comprising a wind vector and a temperature computed at a node P, and in which the second instantaneous cost is determined by said general instantaneous cost formula, with a zero wind, a standard temperature at the node P and a ground speed equal to a predetermined air speed.

11. The method according to claim 1, wherein the improved trajectory is determined by the flight management system as the trajectory minimizing the local costs over all of the trajectory.

12. The method according to claim 1, wherein the improved trajectory is determined by the crew from the graphic representation of the cost grid.

13. The method according to claim 1, wherein the cost grid is represented graphically in the form of a surface.

14. The method according to claim 1, wherein the cost grid is represented graphically in the form of cost function level curves.

15. The method according to claim 1, wherein the graphic representation step comprises a substep including determining and representing current lines at right angles to iso-cost lines on the cost grid.

16. A flight management system to determine an improved trajectory between a point of departure and a point of arrival as a function of a trajectory cost, comprising a flight management computer and lines of non-transitory computer code to be executed on said computer, said lines of non-transitory computer code comprising instructions to perform the steps of the navigation aid method according claim 1.

17. A computer program product, said computer program comprising non-transitory code instructions to perform the steps of the navigation aid method according to claim 1.

* * * * *